United States Patent
Kuczynski

(10) Patent No.: US 9,378,851 B2
(45) Date of Patent: *Jun. 28, 2016

(54) NUCLEAR FUEL

(71) Applicant: Pebble Bed Modular Reactor Proprietary Limited, Centurion (ZA)

(72) Inventor: Leszek Andrzej Kuczynski, Pretoria (ZA)

(73) Assignee: Pebble Bed Modular Reactor Proprietary Limited (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,019

(22) Filed: Apr. 8, 2014

(65) Prior Publication Data

US 2014/0220230 A1    Aug. 7, 2014

Related U.S. Application Data

(63) Continuation of application No. 11/631,230, filed as application No. PCT/IB2005/050737 on Mar. 1, 2005, now Pat. No. 8,724,769.

(30) Foreign Application Priority Data

Mar. 1, 2004   (ZA) .................................. 2004/1687

(51) Int. Cl.
  *G21C 3/07*   (2006.01)
  *G21C 3/58*   (2006.01)
  *G21C 3/62*   (2006.01)
  *G21C 21/02*  (2006.01)

(52) U.S. Cl.
  CPC .. *G21C 3/07* (2013.01); *G21C 3/58* (2013.01); *G21C 3/62* (2013.01); *G21C 3/623* (2013.01); *G21C 3/626* (2013.01); *G21C 21/02* (2013.01); *G21Y 2002/104* (2013.01); *G21Y 2002/206* (2013.01); *G21Y 2002/303* (2013.01); *G21Y 2004/30* (2013.01); *G21Y 2004/303* (2013.01); *G21Y 2004/40* (2013.01); *Y02E 30/38* (2013.01)

(58) Field of Classification Search
  CPC ............ G21C 21/02; G21C 3/58; G21C 3/62; G21C 3/623; G21C 3/626
  See application file for complete search history.

(56) References Cited

U.S. PATENT DOCUMENTS

| | | |
|---|---|---|
| 3,335,063 A | 8/1967 | Goeddel et al. |
| 3,361,638 A | 1/1968 | Bokros et al. |
| 3,649,452 A | 3/1972 | Chin et al. |
| 3,650,896 A | 3/1972 | Goeddel |
| 3,798,123 A | 3/1974 | Lindemer |
| 3,945,884 A | 3/1976 | Freck |
| 3,969,130 A | 7/1976 | Bokros |

(Continued)

FOREIGN PATENT DOCUMENTS

| | | |
|---|---|---|
| DE | 1934554 A1 | 1/1971 |
| EP | 1010183 B1 | 9/2003 |
| GB | 1031154 A | 5/1966 |

*Primary Examiner* — Elena T Lightfoot
(74) *Attorney, Agent, or Firm* — Morriss O'Bryant Compagni

(57) ABSTRACT

This invention relates to a method of preparing nuclear fuel including the step of depositing at least two adjacent series of layers (16, 18) around a kernel (12) of fissile material, each series comprising a layer of pyrolytic carbon (16) contiguous with a layer of silicon carbide (18) and each layer (16, 18) having a thickness of at most (10) micrometers, such that alternate layers of (16, 18) of pyrolytic carbon and silicon carbide are deposited around the kernel (12). The invention extends to a nuclear fuel element (10).

18 Claims, 1 Drawing Sheet

(56) References Cited

U.S. PATENT DOCUMENTS

| | | |
|---|---|---|
| 3,992,258 A | 11/1976 | Tobin |
| 4,006,848 A | 2/1977 | Cramer et al. |
| 4,077,838 A | 3/1978 | Lindemer et al. |
| 4,212,898 A | 7/1980 | Hrovat et al. |
| 4,267,019 A | 5/1981 | Kaae et al. |
| 4,367,184 A | 1/1983 | Stinton |
| 4,597,936 A | 7/1986 | Kaae |
| 4,978,480 A | 12/1990 | Stansfield et al. |
| 5,094,804 A | 3/1992 | Schweitzer |
| 5,192,495 A | 3/1993 | Caldwell et al. |
| 5,434,896 A | 7/1995 | Bryan et al. |
| 6,190,725 B1 | 2/2001 | Lee et al. |

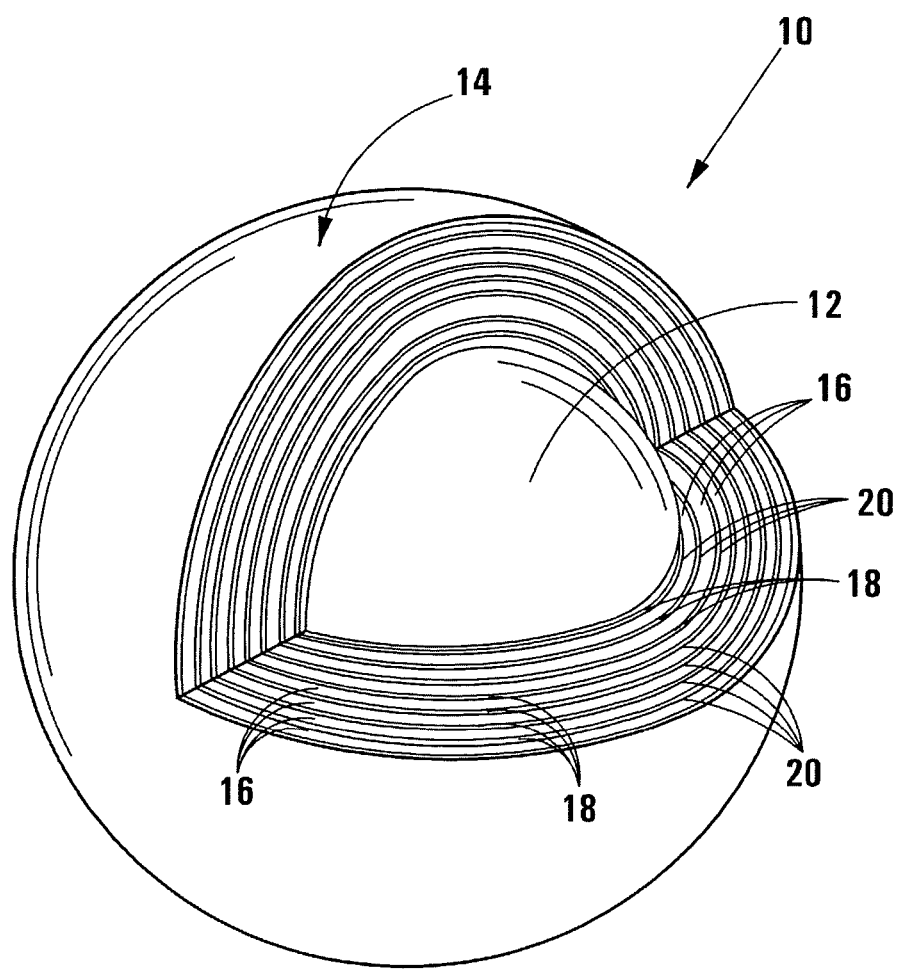

ly the microparticles are about 0.5
NUCLEAR FUEL

CROSS REFERENCE TO RELATED APPLICATIONS

This application is a continuation application that claims priority to Ser. No. 11/631,230, filed Sep. 10, 2007, now issued as U.S. Pat. No. 8,724,769, which is a national filing under 35 U.S.C. §371 from International application PCT/IB2005/050737, filed Mar. 1, 2005, which claims priority to South African application number 2004/1687, filed Mar. 1, 2004, the contents of each of which is incorporated herein by reference.

BACKGROUND OF THE INVENTION

1. Field of the Invention

This invention relates to nuclear fuel. More particularly, the invention relates to a method of preparing a nuclear fuel, to a nuclear fuel particle and to a nuclear fuel element.

2. Description of the Related Art

In a nuclear reactor of the high temperature gas-cooled type, use is made of fuel comprising a plurality of spherical fuel elements. The fuel elements include a core comprising fuel particles, each having a kernel of fissile material, dispersed in a matrix. The spherical fuel elements are known as pebbles and the nuclear reactor of this type is generally known as a pebble bed reactor.

BRIEF SUMMARY OF THE INVENTION

According to one aspect of the invention, there is provided a method of preparing nuclear fuel, which method includes the step of depositing at least two adjacent series of layers around a kernel of fissile material, each series comprising a layer of pyrolytic carbon contiguous with a layer of silicon carbide and each layer having a thickness of at most 10 micrometers, such that alternate layers of pyrolytic carbon and silicon carbide are deposited around the kernel.

Preferably each layer has a thickness of between about 3 micrometers and about 9 micrometers. More particularly, each layer of silicon carbide may have a thickness of between about 3 micrometers and about 6 micrometers. Each layer of pyrolytic carbon may have a thickness of between about 4 micrometers and about 9 micrometers.

The deposited alternate layers of pyrolytic carbon and silicon carbide may have a total thickness of between about 230 micrometers and about 420 micrometers.

The deposition may be by chemical vapor deposition techniques. The deposition may be carried out at a temperature of at least 1 000 degrees Celsius in an argon environment. The deposition may be carried out at a pressure of between about 1.3 kPa and about 2.5 kPa, preferably about 1.7 kPa.

The deposition of the pyrolytic carbon and silicon carbide layers may take place as a continuous process, ie. the method may include switching between the chemical precursors for deposition of the pyrolytic carbon and silicon carbide layers respectively such that transition zones comprising pyrolytic carbon mixed with silicon carbide are formed between each layer of pyrolytic carbon and a contiguous layer of silicon carbide. The transition zones between each layer of pyrolytic carbon and its contiguous layer of silicon carbide may have a thickness of between about 0.5 micrometers and about 2 micrometers.

The kernel may be of uranium dioxide. The kernel may be of size/diameter about 500 micrometers.

The method may include the prior step of forming a plurality of nuclear fuel particle kernels by atomising a uranyl nitrate solution to form microparticles, followed by baking the microparticles at high temperature, to yield uranium dioxide microparticles. Typically the microparticles are about 0.5 mm in diameter.

Preferably, the silicon carbide deposited will be beta polytype silicon carbide.

According to another aspect of the invention, there is provided a coated nuclear fuel particle, which includes a kernel of a fissile material and at least two adjacent series of layers deposited around the kernel, each series comprising a layer of pyrolytic carbon contiguous with a layer of silicon carbide and each layer having a thickness of at most 10 micrometers, such that alternate layers of pyrolytic carbon and silicon carbide are deposited around the kernel.

According to a still another aspect of the invention, there is provided a nuclear fuel element which includes a plurality of coated nuclear fuel particles dispersed in a matrix, each nuclear fuel particle including a kernel of fissile material and having at least two adjacent series of layers deposited around the kernel, each series comprising a layer of pyrolytic carbon contiguous with a layer of silicon carbide, such that alternate layers of pyrolytic carbon and silicon carbide are deposited around the kernel.

Each layer may have a thickness of at most 10 micrometers.

Preferably each layer has a thickness of between about 3 micrometers and about 9 micrometers. More particularly, each layer of silicon carbide may have a thickness of between about 3 micrometers and about 6 micrometers. Each layer of pyrolytic carbon may have a thickness of between about 4 micrometers and about 9 micrometers.

The or each kernel may be of uranium dioxide. The or each kernel may be of size about 500 micrometers.

The deposited alternate layers of pyrolytic carbon and silicon carbide may have a total thickness of between about 180 micrometers and about 420 micrometers.

More particularly, the or each coated nuclear fuel particle may have deposited around the kernel, in sequence, an innermost layer of pyrolytic carbon, a layer of silicon carbide, followed by a further layer of pyrolytic carbon and a further layer of silicon carbide. Still further layers of pyrolytic carbon and silicon carbide may be deposited in sequence around the kernel. Typically, an outer layer of pyrolytic carbon is deposited around the kernel.

In a preferred embodiment of the invention the coated nuclear fuel particle includes seven layers of pyrolytic carbon and six intermediate layers of silicon carbide deposited around the kernel having a total thickness of between about 180 micrometers and about 270 micrometers.

The or each coated nuclear fuel particle may include transition zones defined between each layer of pyrolytic carbon and each contiguous layer of silicon carbide, each transition zone comprising pyrolytic carbon mixed with silicon carbide. The transition zone between each layer of pyrolytic carbon and each contiguous layer of silicon carbide may have a thickness of between about 0.5 micrometers and about 2 micrometers.

BRIEF DESCRIPTION OF THE DRAWING

In the drawings, which illustrate one aspect of the disclosure;

FIG. 1 is a partial sectional view of a coated nuclear fuel particle in accordance with the disclosure.

DETAILED DESCRIPTION OF THE INVENTION

The invention will now be described, by way of example, with reference to the accompanying diagrammatic drawing and the following Example:

Example 1

A plurality of nuclear fuel particle kernels was formed by atomisation of uranyl nitrate to form microspheres. The microspheres were then gelled and baked at a high temperature, ie. calcinated, to yield uranium dioxide particles, each to provide a kernel of fissile material for a nuclear fuel particle.

A batch of uranium dioxide particles was suspended in a fluidised bed type deposition chamber of a chemical vapor deposition reactor, the deposition chamber having an argon environment. The deposition chamber was heated to a temperature of at least 1000 degrees Celsius.

Pyrolytic carbon was deposited on the surface of the uranium dioxide particles to a thickness of 8 micrometers. Next, silicon carbide was deposited to a thickness of about 6 micrometers on the surface of the pyrolytic carbon coating.

The deposition was carried out a pressure of 1.7 kPa.

Further series of layers, each series comprising a layer of pyrolytic carbon contiguous with a layer of silicon carbide, were deposited around the kernel as described above, to yield a coated nuclear fuel particle having alternate layers of pyrolytic carbon and silicon carbide around its kernel, each layer having a thickness of at most about 10 micrometers.

During switching of the source gases for deposition of the pyrolytic carbon to those for the deposition of silicon carbide, and vice versa, a transition zone comprising pyrolytic carbon mixed with silicon carbide was formed between the layer of pyrolytic carbon and its contiguous layer of silicon carbide, the transition zone having a thickness of between about 2 micrometers and about 4 micrometers.

Reference is made to FIG. 1 of the drawings, which shows a part sectional view of a coated nuclear fuel particle in accordance with the invention. In FIG. 1, reference numeral 10 refers generally to a coated nuclear fuel particle of the invention, prepared in accordance with the above Example. The coated fuel particle 10 includes a kernel 12 comprised of a uranium dioxide particle. A coating, generally indicated by reference numeral 14, is deposited on the kernel 12, the coating 14 including pyrolytic carbon 16 alternated with silicon carbide 18. The coating 14 includes seven layers of pyrolytic carbon 16 alternated with six layers of silicon carbide 18. Transition zones 20 are defined between each layer of pyrolytic carbon 16 and each contiguous layer of silicon carbide 18. FIG. 1 is for illustrative purposes only and it is to be appreciated that, as a result of the coating/deposition process being carried out whilst at all times maintaining a high temperature, ie. not permitting the temperature to drop below 1000 degrees Celsius, boundaries between different compounds/materials deposited are not clearly defined in practice.

Discussion

The optimal thickness of the pyrolytic carbon and silicon carbide layers is calculated on the basis of energetic models/criteria of fracture propagation, taking into account a degree of ovality of the particle and variations in layer thicknesses. The layers of pyrolytic carbon and silicon carbide deposited in accordance with the method of the present invention have a thickness below/less than a critical thickness of the relevant material.

As a result of the continuous coating process employed in the deposition of the alternating layers of pyrolytic carbon and silicon carbide, upon switching of the chemical precursor for deposition of pyrolytic carbon to that for deposition of silicon carbide and vice versa, a transition zone is formed comprising a mixture of pyrolytic carbon and silicon carbide between adjacent pyrolytic carbon and silicon carbide layers. The thickness of each transition zone will depend upon the parameters of the deposition process and may be determined by microscopic analysis following non-destructive methods of sample preparation. The thickness of the transition zones will influence the number of layers of pyrolytic carbon and silicon carbide that can be deposited. It has been observed that when switching from deposition of pyrolytic carbon to deposition of silicon carbide, the thickness of the transition zone tends to be greater than when switching from silicon carbide to pyrolytic carbon.

The crystal structure of the silicon carbide layers is assessed to determine the size and type of silicon carbide deposited which in turn facilitates calculation of adequate layer thickness of the silicon carbide layer. Under the preferred deposition conditions, the silicon carbide exhibits epitaxial growth and a cubic structure.

The differing lattice geometries of pyrolytic carbon and silicon carbide tend to result in internal stresses arising within the growing silicon carbide crystals deposited on a pyrolytic carbon surface. These internal stresses are higher at areas of larger curvature of the fuel particle. Because of the natural tendency of the growing layer being deposited to obtain the lowest possible energy level, crystal growth is more rapid at areas of lower internal stress, ie. of lesser curvature, such that silicon carbide layer thickness is not uniform and tends to be lesser at areas of higher curvature of the adjacent layer of pyrolytic carbon.

Simulation of a coated nuclear fuel particle having seven layers of pyrolytic carbon and six layers of silicon carbide showed that the ovality tolerance of the coated particle was maintained even with a kernel of cubic shape. The existence of gas bubbles, voids, precipitates, vacancy clusters, stacking fault tetrahedra, self-interstitial atom clusters and other boundary and lattice defects arising from deposition processes was taken into account in the simulation.

The Applicant believes that the coated nuclear fuel particle of the invention will be able to withstand internal pressures of about 400 MPa at a temperature 1 800 degrees Celsius for about 30 days.

The Applicant believes that the multiple layers of pyrolytic carbon alternated with silicon carbide as coatings of subcritical thickness (thickness of at most 10 micrometers) around the kernel of the coated nuclear fuel particle of the invention will improve particle strength and will provide an improved diffusion barrier for fission products generated in the kernel, with more energy boundaries (i.e. between pyrolytic carbon and silicon carbide layers) which are required to be overcome. Further it is believed that the number of coating layers reduces the sensitivity of the coated nuclear fuel particle to the effect of kernel geometry dispersions through the coated particle and propensity for crack initiation will be reduced.

The invention claimed is:

1. A method of preparing a spherical nuclear fuel particle, which method includes the step of depositing at least two adjacent series of spherically continuous layers around a kernel of fissile material to form a spherical nuclear fuel particle, each series comprising a layer of pyrolytic carbon contiguous with a layer of silicon carbide and each layer having a thickness of at most 9 micrometers, with alternate layers of pyrolytic carbon and silicon carbide thus being deposited around the kernel.

2. The method as claimed in claim 1, in which each layer has a thickness of between 3 micrometers and 9 micrometers.

3. The method as claimed in claim 2, in which each layer of silicon carbide has a thickness of between 3 micrometers and 6 micrometers.

4. The method as claimed in claim 2, in which each layer of pyrolytic carbon has a thickness of between 4 micrometers and 9 micrometers.

5. The method as claimed in claim 1, in which the layers are deposited by chemical vapor deposition techniques.

6. The method as claimed in claim 5, in which the deposition of layers is carried out at a pressure of between 1.3 kPa and 2.5 kPa.

7. The method as claimed in claim 6, in which the deposition of layers is carried out at a pressure of 1.7 kPa.

8. The method as claimed in claim 1, in which the deposition of the pyrolytic carbon and silicon carbide layers takes place as a continuous process, the method including switching between chemical precursors for deposition of the pyrolytic carbon and silicon carbide layers respectively such that transition zones comprising pyrolytic carbon mixed with silicon carbide are formed between each layer of pyrolytic carbon and a contiguous layer of silicon carbide.

9. The method as claimed in claim 8, in which the transition zones between each layer of pyrolytic carbon and its contiguous layer of silicon carbide have a thickness of between 0.5 micrometers and 2 micrometers.

10. The method as claimed in claim 1, which includes the prior step of forming a plurality of kernels of uranium dioxide by atomising a uranyl nitrate solution to form microparticles, followed by baking the microparticles at high temperature, to yield uranium dioxide microparticles.

11. The method as claimed in claim 1, in which the deposited silicon carbide is of the beta polytype.

12. The method according to claim 1, in which the kernel has a diameter of 500 micrometers.

13. A method of preparing a spherical nuclear fuel particle, which method includes the step of depositing at least two adjacent series of spherically continuous layers around a kernel of fissile material to form a spherical nuclear fuel particle, each series comprising a layer of pyrolytic carbon contiguous with a layer of silicon carbide and each layer having a thickness of at most 9 micrometers, with alternate layers of pyrolytic carbon and silicon carbide thus being deposited around the kernel, with the deposition of the pyrolytic carbon and silicon carbide layers taking place as a continuous process by switching between chemical precursors for deposition of the pyrolytic carbon and silicon carbide layers respectively such that transition zones comprising pyrolytic carbon mixed with silicon carbide are formed between each layer of pyrolytic carbon and a contiguous layer of silicon carbide.

14. The method as claimed in claim 13, in which the transition zones between each layer of pyrolytic carbon and its contiguous layer of silicon carbide have a thickness of between 0.5 micrometers and 2 micrometers.

15. A method of preparing a spherical nuclear fuel particle, which method includes the step of depositing at least two adjacent series of spherically continuous layers around a kernel of fissile material to form a spherical nuclear fuel particle, each series comprising a layer of pyrolytic carbon contiguous with a layer of silicon carbide and each layer having a thickness of at most 9 micrometers, with alternate layers of pyrolytic carbon and silicon carbide thus being deposited around the kernel, the method including a prior step, preceding the step of depositing at least two adjacent series of spherically continuous layers around the kernel of fissile material, of forming a plurality of kernels of fissile material.

16. A method according to claim 15, in which the fissile material is uranium dioxide.

17. A method according to claim 1, in which the fissile material is uranium dioxide.

18. A method according to claim 13, in which the fissile material is uranium dioxide.

\* \* \* \* \*